United States Patent
Saunders et al.

(12) 
(10) Patent No.: US 6,351,226 B1
(45) Date of Patent: Feb. 26, 2002

(54) BLOCK-BY-BLOCK DATA COMPRESSION WITH QUANTIZATION CONTROL

(75) Inventors: Nicholas Ian Saunders, Basingstoke; Robert Mark Stefan Porter, Maidenhead, both of (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/627,724

(22) Filed: Jul. 28, 2000

(30) Foreign Application Priority Data

Jul. 30, 1999 (GB) .............................. 9918014

(51) Int. Cl.[7] .............................................. H03M 7/00
(52) U.S. Cl. ......................................... 341/50; 348/420
(58) Field of Search ............................. 341/50, 51, 52; 348/409, 403, 420

(56) References Cited

U.S. PATENT DOCUMENTS

| | | | | |
|---|---|---|---|---|
| 5,590,139 A | * | 12/1996 | Suzuki et al. | ............... 371/49.1 |
| 6,064,435 A | * | 5/2000 | Iwamura | ..................... 348/416 |

FOREIGN PATENT DOCUMENTS

| | | | | |
|---|---|---|---|---|
| GB | 2 306 831 | 5/1997 | ............ | H04N/7/50 |
| GB | 2 323 493 | 9/1998 | ............ | H03M/1/12 |

* cited by examiner

*Primary Examiner*—Peguy JeanPierre
(74) *Attorney, Agent, or Firm*—Frommer Lawrence & Haug LLP; William S. Frommer

(57) ABSTRACT

Data are compressed on a block-by-block basis. A frequency-transformer frequency-transforms input data to generate corresponding groups of coefficient values representing different frequency components. A quantiser operates on the groups of coefficient values to map each of a contiguous plurality of ranges of coefficient values onto respective quantised data values, the extent of each range being controlled by a quantisation factor and the first non-zero range boundary being defined by a range boundary parameter. A detector operates to: (a) trial-encode at least some of the data blocks using a range of at least one quantisation factor and at least a subset of the range of boundary parameter regimes available for use by the quantiser, in order to assess the quantity of compressed data produced with each quantisation factor/boundary parameter regime; (b) trial-decode the trial-encoded blocks using a corresponding quantisation factor but a single predetermined boundary parameter; (c) compare the trial-decoded blocks with the data blocks before trial encoding, in order to assess data errors introduced by the trial-encoding and decoding; and (d) detect whether the relationship between quantity of the data produced by the trial-encoding and data errors introduced by the trial-encoding is substantially monotonic. A quantisation controller responds to the detection that the relationship between the quantity of data produced by the trial-encoding and the data errors introduced by the trial-encoding is not substantially monotonic, to vary the range of boundary parameter regimes available for use by the quantiser.

11 Claims, 3 Drawing Sheets

BLOCK-BY-BLOCK DATA COMPRESSION WITH QUANTIZATION CONTROL

BACKGROUND OF THE INVENTION

1. Field of the Invention

This invention relates to data compression.

2. Description of the Prior Art

It has long been recognised that some video data compression systems, such as systems broadly defined by the MPEG-2 standard, use compression techniques in which the number of compressed data bits generated for a picture, or a part of a picture, depends on the nature of the image represented by that picture. Also, the main compression parameter which can be altered from block to block or picture to picture to change the bit rate, namely the degree of quantisation, has a somewhat nonlinear and difficult to predict effect on the resulting bit rate.

In MPEG encoders, the quantisation system operates broadly as follows. Coefficients representing a DCT-transformed version of each image block (there being many such blocks forming a single image) are divided by a variable referred to as the quantisation factor Q. A predetermined constant value between 0 and 1 is then added to each resulting data value, and the values are finally truncated down to the next lowest integer.

In the so-called "Test Model 5" (TM5) of the MPEG 2 system, the predetermined constant value added before truncation is $3/8$. This means that if the fractional part of a DCT coefficient is between 0 and $5/8$, that value will be rounded down. If the fractional part is between $5/8$ and (very close to) 1, that value will be rounded up. The corresponding decoder is set up in the expectation that this predetermined constant value has been used as part of the rounding process in the encoder.

The non-linear and fairly unpredictable nature of the change in bit rate resulting from variation of the quantisation factor is of particular concern in systems such as video tape recorders, where there is generally a fixed allocation of bits for each picture or group of pictures (GOP) and little or no scope for exceeding that fixed allocation. As a result, techniques for bit rate control in video data compression are very important.

The TM5 system proposes a rate control algorithm that allocates bits between pictures in accordance with a "global complexity estimation" dependent upon the actual number of bits generated in respect of a preceding picture and the degree of quantisation used to achieve this.

The actual bit rate achieved during compression of a picture is then monitored and the degree of quantisation varied during compression to try to achieve the desired total bit rate for that picture.

A problem with this system is that when a change is made from one quantisation factor to an adjacent quantisation factor (i.e. if the quantisation factor is changed by the smallest amount allowable by the system), the change in the number of bits generated for a current image block can either be inconveniently large or inconveniently small, depending to some extent on whether the image has previously been encoded using a similar compression system.

If the image has not previously been compressed, then the change in bit rate on moving to an adjacent quantisation factor can be inconveniently large, so that the rate control system is denied a sufficiently fine control over the output bit rate. In these circumstances, there is a need to provide a finer variation of output bit rate than that provided by the set of quantisation factors normally available to an MPEG-type system.

In contrast, in a multi-generation system where the image data has been previously compressed and decompressed, there can tend to be too small a variation in output bit rate when the quantisation factor is changed to an adjacent value. This problem can arise because of previous quantisation processes applied to the image, so that the DCT coefficients representing the previously-compressed image will tend to include only a subset of the normal range of coefficient values. A small change in the quantisation factor may not change the final values obtained after addition of the constant value and subsequent truncation. So, in these circumstances, there is a need for the rate control algorithm to have access to a greater spread of possible output bit rates.

GB-A-2 323 493 and WO98/38800 disclose video data compression systems in which the rounding point in the compression process, as well as the quantisation factor, is varied. This can be a useful way of providing more possible output bit rates.

SUMMARY OF THE INVENTION

This invention provides data compression apparatus in which data are compressed on a block-by-block basis, the apparatus comprising:

a frequency-transformer for frequency-transforming blocks of data to generate corresponding groups of coefficient values representing respective frequency components of the data blocks;

a quantiser operable on the groups of coefficient values to map each of a contiguous plurality of ranges of coefficient values onto respective quantised data values, the extent of each range being controlled by a quantisation factor and the first non-zero range boundary being defined by a range boundary parameter; the quantiser being operable to vary the boundary parameter between data blocks by selecting from a range of boundary parameter regimes;

a detector operable:
(a) to trial-encode at least some of the data blocks using a range of at least one quantisation factor and at least a subset of the range of boundary parameter regimes available for use by the quantiser, in order to assess the quantity of compressed data produced with each quantisation factor/boundary parameter regime;
(b) to trial-decode the trial-encoded blocks using a corresponding quantisation factor;
(c) to compare the trial-decoded blocks with the data blocks before trial encoding, in order to assess data errors introduced by the trial-encoding and decoding;
(d) to detect whether the relationship between quantity of data produced by the trial-encoding and data errors introduced by the trial-encoding is substantially monotonic; and a quantisation controller operable in response to a detection that the relationship between quantity of data produced by the trial-encoding and data errors introduced by the trial-encoding is not substantially monotonic, to vary the range of boundary parameter regimes available for use by the quantiser.

The invention builds on the system proposed by the two documents cited above, by recognising that the usefulness of a variation of the rounding point/boundary parameter is dependent upon there being a substantially monotonic relationship between the data quantity produced and the quality of the compressed data, as the boundary parameter is varied. If this relationship becomes non-monotonic, it can be better not to use that boundary parameter regime.

Further respective aspects and features of the present invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
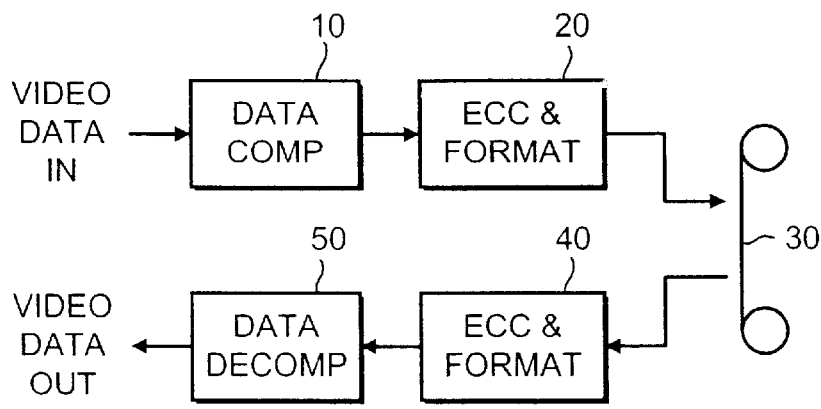
FIG. 1 schematically illustrates a video tape recorder.

FIG. 1 is a schematic diagram of a video tape recorder (VTR) using data compression. Video data received by the VTR is supplied first to a data compression apparatus 10 in which the data quantity of the video data is reduced by compression techniques to be described below. The compressed video data is then passed to an error correcting code (ECC) processor and formatter which formats the data into an appropriate form for storage on tape and adds various error correcting codes in accordance with conventional techniques. The formatted data is then stored on a tape medium 30.

At replay, data is read from the tape medium 30 and processed by an ECC processor and formatter 40. This uses the ECC to detect any errors resulting from the data storage process and, hopefully, to correct them. It also re-formats the data into an appropriate form for decompression. Decompression is then carried out by a data decompression apparatus 50 which is arranged to provide a decompression process complimentary to the compression process applied by the data compression apparatus 10.

The key features of the embodiment which will be described below are found in the data compression apparatus 10. The remaining parts of FIG. 1 may be implemented using known techniques.

Figure 2:
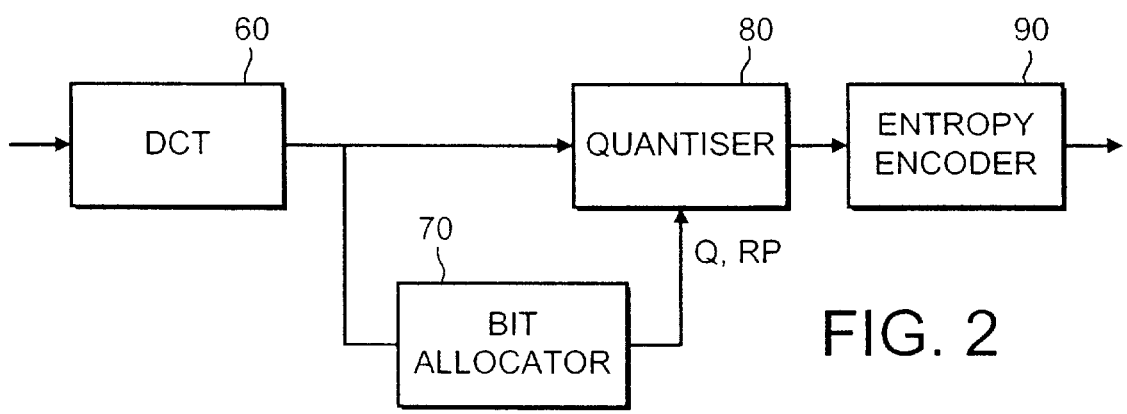
FIG. 2 schematically illustrates a data compression apparatus.

FIG. 2 is a schematic diagram of the data compression apparatus 10.

The VTR described in connection with this embodiment uses so-called "I" (intra) pictures only. So, unlike some implementations of systems such as MPEG-2, each picture (generally a frame) is compressed without reference to adjacent or nearby pictures. While this means that some of the compression efficiency which is possible with a long-GOP system using P frames and B frames cannot be achieved, it does mean that editing can easily take place at any desired frame boundary in the video signal. So, an I-frame VTR is particularly suited for studio use.

The fact that only I-frames are used means that the diagram shown in FIG. 2 is much simpler than a conventional long-GOP encoder.

So, FIG. 2 illustrates a DCT encoder 60, a bit allocator 70, a quantizer 80 and an entropy encoder 90. The DCT encoder 60 operates to decompose the picture into blocks of 8×8 pixels and to apply a discrete cosine transform to generate a corresponding matrix of 8×8 DCT coefficients representing increasing spatial frequency components.

In parallel with the DCT process, the bit allocator 70 examines the input images and allocates a proportion of the available number of bits for encoding each image (which is generally fixed quantity because of storage constraints imposed by the tape medium 30) to different areas of the image. In the present example, the allocation is carried out on a macroblock (MB) by macroblock basis. Here, the term macroblock refers to an array of 16×16 pixels, i.e. four DCT blocks. The specific operation of the bit allocator will be described in much more detail below, but as its output it supplies target data quantities for each macroblock to the quantizer 80.

The quantizer 80 carries out a thresholding and quantization process which involves zeroing coefficients below a certain threshold and quantizing the remaining ones, with the degree of quantization being selected in order to control the resulting output data quantity and also to account (in a conventional way) for image attributes such as so-called image activity which can vary from area to area within the image. Features of the operation of the quantiser will be described below with reference to FIG. 3.

Finally, the entropy encoder 90 carries out run length coding and variable length (Huffmann) coding so that more frequently occurring bit patterns within the run length encoded sequence are encoded to form shorter output data words.

Figure 3:
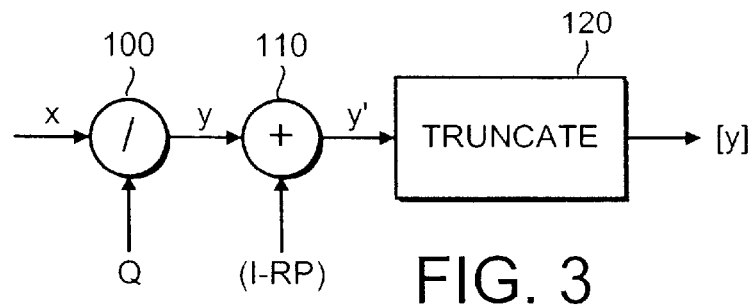
FIG. 3 schematically illustrates a data quantiser.

FIG. 3 schematically illustrates a part of the quantiser 80 of FIG. 2.

An incoming DCT coefficient, x, is passed to a divider 100 where it is divided by a quantisation factor Q. The resulting divided coefficient value y is then passed to an adder where a value (1-RP) is added, to give a modified value y'. The value y' is then truncated to the next lower integer value by a truncator 120 to yield a truncated value [y].

The quantity RP is the rounding point, or decision point. If the fractional (non-integer) part of y is greater than or equal to RP, then y will be rounded up to the next higher integer. If the fractional part of y is less than RP, then y will be rounded down to the next lower integer.

The arrangement by which (1-RP) is added is a simplification of the apparatus as it avoids the need for a comparison between the fractional part and the rounding point. If the fractional part of y is greater than or equal to RP, then the sum of:

$$y'=y+(1-RP)$$

will yield a value of y' which is greater than or equal to the next higher integer. So, when truncation takes place, y' will be truncated to the next higher integer.

In a real example, in the MPEG TM5 system, the (fixed) RP is ⅝ so (1-RP) is ⅜. This means that for any values of y where the fractional part is greater than or equal to RP (⅝), the addition of (1-RP) (=⅜) will take y' to the next higher integer value.

In MPEG TM5, the quantisation factor Q is set by the bit allocator 70, but the rounding point RP is fixed from block to block and from DCT coefficient to DCT coefficient. In contrast, in the present system, both Q and RP can vary from block to block, and RP can also vary from DCT coefficient to DCT coefficient within the blocks. The present embodiments use the bit allocator 70 to select both Q and RP for the quantisation process.

First, the variation in RP from DCT coefficient to DCT coefficient will be described.

Figure 4:
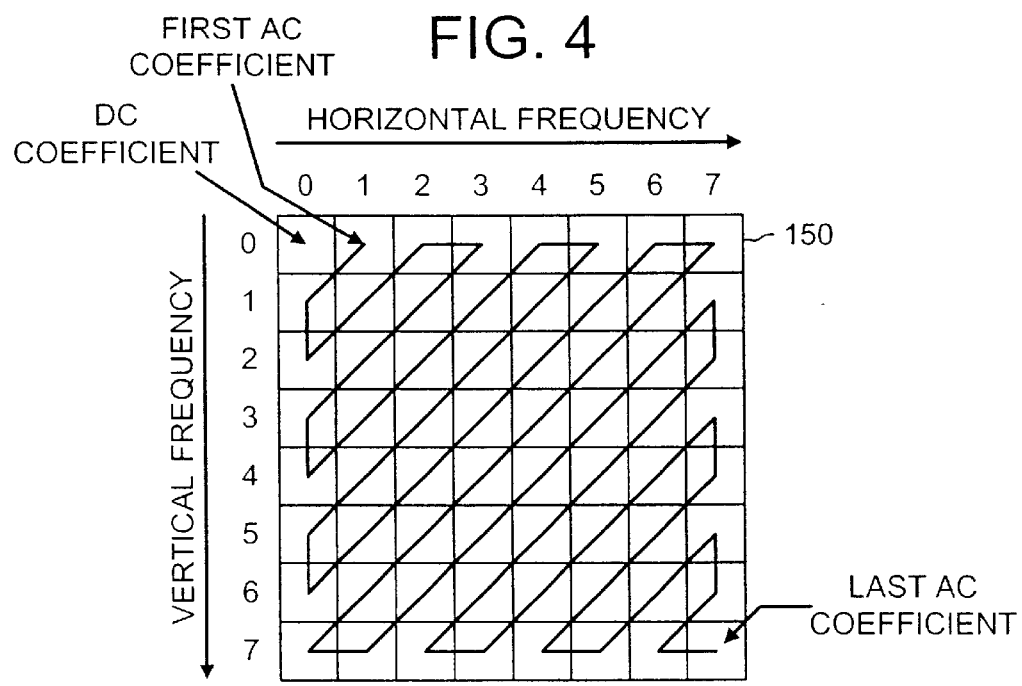
FIG. 4 schematically illustrates a DCT block.

FIG. 4 is a schematic diagram of a block 150 of 64 DCT coefficients. The block 150 is generated by a discrete cosine transformation of a block of 8×8 pixels of an input image of a video signal. Each coefficient represents a respective horizontal and vertical frequency component of the block of pixels, and for convenience the coefficients are shown as an array with increasing horizontal frequency from left to right and increasing vertical frequency from top to bottom. Also shown in FIG. 4 is a scanning order, following a so-called "zig-zag scan", which is the order in which the (quantised) coefficients are passed to a run-length encoder.

It has long been recognised that the information represented by the different DCT coefficients varies in subjective importance to the image. So, the so-called "dc" coefficient shown in the top-left of FIG. 4, which represents the lowest horizontal and vertical frequency components, is considered to be the most important to the successful encoding and decoding of the image block, and after that the relative importance tends to decrease as the horizontal and vertical frequencies increase.

This feature of the DCT data is handled in MPEG systems by quantising the dc coefficient less harshly and then progressively increasing the harshness of quantisation as the perceived importance to the human visual system (HVS) of each coefficient decreases towards the higher spatial frequencies. This has the effect of allocating more of the available bit rate to the more important DCT coefficients. An example of a matrix of quantisation variations for each coefficient, which are multiplicative variations relative to the base quantisation level selected for a DCT block, is as follows. Here, the layout of the coefficients within the 8×8 array is the same as that used in FIG. 4.

TABLE 1

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

The coefficient variation scheme shown in Table 1 is just one example of such schemes. In fact, the scheme can be set up at an MPEG or other encoder and then transmitted with the actual compressed data so that the same scheme can then be used when decompressing the data at the receiver.

several different schemes for varying the rounding point from DCT coefficient to DCT coefficient will now be described.

A main befit of varying the RP within a DCT block occurs in "transcoding" applications, such as bit rate changing, where video data is recompressed after having been through one or more previous generations of compression. Indeed, in these circumstances it can be useful to base the variation of RP on the quantisation variation matrix used in a previous generation (e.g. the preceding generation) of compression rather than that used in the current compression, if the two are different. the matrix used for the preceding compression will generally be available with the associated compressed date and so can be used in the following derivations. Alternatively, of course, the following derivations can be based on the "current" matrix. However, the technique is also useful in first-generation encoding.

in any MPEG-like compression system, one of the main variables which can be used to change the data quantity generated for a picture is the quantisation factor. The normal intention is that a range of quantisation factors will give a corresponding range of data quantities for, say, blocks of the image, so that the quantisation factors can then be selected across the image to give a desired overall data quantity. However, in a multi-generation compression system, it can be that varying the quantisation factor within a normally-acceptable range does not provide a useful variation of data quantity. On the contrary, the resulting data quantities might not be ideally spaced—maybe some to close together, some too far apart, making an effective bit rate control very difficult. This problem can be attributed to the quantisation and dequantisation which was performed in previous generations, which took the reasonably even spread of possible DCT coefficient values and concentrated them onto a small number of preferred values. In these circumstances, a small change in quantisation factor does not substantially affect the quantisation process applied to this "clustered" subset of possible coefficient values.

It has been found empirically that by varying the rounding point within a DCT block using one of the schemes to be described below, a better spread of data quantities can be obtained when the quantisation factor is varied in a multi-generation system.

The general principle underlying several of the following techniques is that higher frequency DCT coefficients tend to be given higher rounding points, to exploit the human visual system's lower sensitivity to high frequency quantisation errors.

(a) Stepped Rounding

This scheme divides the DCT coefficients into two or more discrete groups, with each group being given a respective rounding point. The groups can be arrived at in at least two ways: one way is simply to number the coefficients from 0 to 63 in a simple zig-zag scan order (see FIG. 4) from top-left to bottom-right:

TABLE 2

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 | while another involves numbering the coefficients in the order of perceived importance to the human visual system. This ordering can be arrived at by following the order of size of the quantisation factor variations mentioned above, and leads to the following numbering of coefficients, where the same number in the ordering is used for identical variation values:

TABLE 3

| 0  | 1  | 4  | 6  | 13 | 19 | 27 | 37 |
|----|----|----|----|----|----|----|----|
| 1  | 1  | 6  | 12 | 19 | 28 | 37 | 46 |
| 4  | 6  | 13 | 19 | 28 | 37 | 37 | 48 |
| 6  | 6  | 13 | 19 | 28 | 37 | 46 | 51 |
| 6  | 13 | 19 | 28 | 35 | 43 | 51 | 56 |
| 13 | 19 | 28 | 35 | 43 | 51 | 56 | 60 |
| 13 | 19 | 28 | 37 | 48 | 54 | 58 | 61 |
| 19 | 28 | 43 | 48 | 54 | 58 | 61 | 63 |

In either of these numbering/ordering schemes, rounding points can be allocated to DCT coefficients as a series of two or more groups of coefficients.

For example:

coefficients 0 to 31: RP=½ coefficients 32 to 63: RP=¾

As a further example, a plurality of sets of RPs can be defined, with the selection between the sets being made on a block-by-block or other basis as part of a rate control algorithm (see below):

TABLE 4

| Coeff No   | 0–15 | 16–30 | 31–47 | 48–63 |
|------------|------|-------|-------|-------|
| scheme (a) | 1/2  | 1/2   | 1/2   | 1/2   |
| scheme (b) | 1/2  | 1/2   | 1/2   | 3/4   |
| scheme (c) | 1/2  | 1/2   | 3/4   | 3/4   |
| scheme (d) | 1/2  | 3/4   | 3/4   | 3/4   |
| scheme (e) | 3/4  | 3/4   | 3/4   | 3/4   |

(b) Scaled HVS Matrix

Here the HVS quantisation matrix (table 1) is scaled directly to give a range of rounding points between, say, 0.5 and 0.75. So, for each DCT coefficient:

$$RP = 0.5 + 0.25 * \frac{HVS\ coeff\ \text{from table 1}}{HVS\ coeff_{max} - HVS\ coeff_{min}}$$

(c) Power-based Method

A power-based curve is used to scale the results obtained from the HVS matrix in (b) in order to lift the rounding points in the mid to high frequency range.

One example of a suitable function is:

$$scalar = 1 + \left\{ \left(\frac{x}{63}\right) - \left(\frac{x}{63}\right)^y \right\} * k$$

where x is the DCT coefficient number (in accordance with the simple (zig-zag) numbering scheme of table 2 or the HVS-ordered scheme of table 3) and y and k are constants. One set of suitable values is:

y=5 k=2 although other values can of course be used.

(d) Gaussian-based Method

Here a "skewed" gaussian function is used to scale the HVS matrix values of method (b) to a suitable range of rounding points. A suitable function is a gaussian curve in which the standard deviation decreases with increasing spatial frequency of coefficients, for example:

s.d.=(96-x)/8 mean=48 where x is the DCT coefficient number (in accordance with the simple zig-zag numbering scheme of table 2 or the HVS-ordered scheme of table 3) and s.d. is the standard deviation. A further multiplicative function is applied to scale the results obtained by method (b), namely:

scalar=1+Gaussian(mean, s.d.)*$k_2$

A suitable value of $k_2$ is 7.5.

(e) Exponential Method

This method simply uses an exponential curve to provide the rounding point, for example:

$$RP = e^{\left(\frac{x}{denom}\right)}$$

linearly scaled to the required range, e.g. 0.5 to 0.75. The variable x is the coefficient number, using either the simple zig-zag numbering scheme of table 2 or the HVS-related numbering scheme of table 3. A suitable value of the variable "denom" was found to be 28.

So, it will be seen that there are many different ways of implementing a rounding point which varies between coefficients or groups of coefficients within a DCT block. These techniques can be used independently, or can be combined with a variation in the "base" rounding point as described below. The RP values for coefficients within a DCT block can be calculated as needed or can be derived in advance and stored in a look-up table such as a 64-entry ROM.

Figure 5:
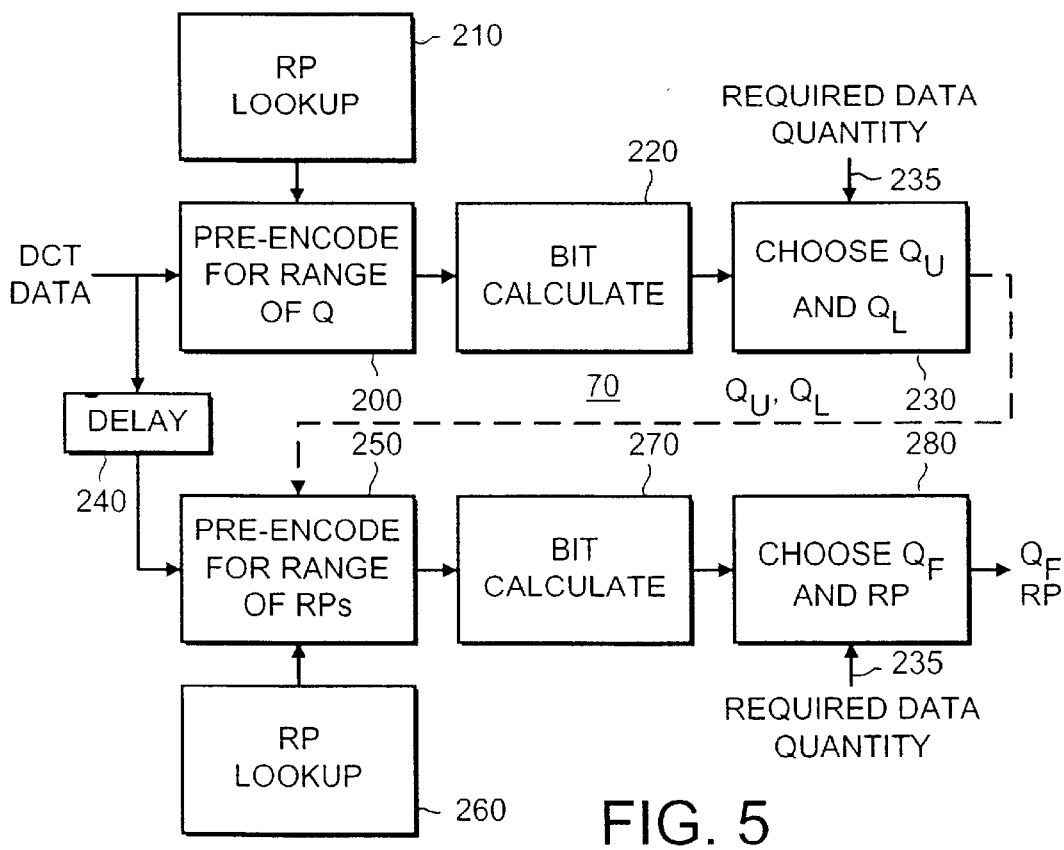
FIG. 5 schematically illustrate a bit allocator.

FIG. 5 schematically illustrates a bit allocator 70.

The bit allocator comprises a first pre-encoder 200 and an associated RP look-up table 210, a first bit calculator 220, a Q selector 230, a delay 240, a second pre-encoder 250 with an associated RP look-up table 260, a second bit calculator 270 and a Q/RP selector 280.

DCT data is supplied in parallel to the first pre-encoder 200 and the delay 240. the delay 240 (e.g. a memory device such as a FIFO) delays the data before passing it to the second pre-encoder 250. The delay period of the delay 240 is arranged so that the second pre-encoder can receive the results of the first pre-encoding process, and the data from which those results were derived, at the same time.

The first pre-encoder performs multiple pre-encoding processes at different values of Q (quantisation factor) but a fixed rounding point scheme obtained from the RP look-up memory 210. In this example, the RP scheme is an exponential scheme (example (e) above) with a range of RP between 0.5 (low frequency DCT coefficients) and 0.75 (high frequency DCT coefficients). So, as each coefficient is quantised and rounded during the pre-encode process, the first pre-encoder looks up the appropriate RP to use for that coefficient from the RP look-up 210.

In general terms, the pre-encode process is established in the art, but particular reference is made to GB-A-2 306 831 for further details. The pre-encode process may be carried out on an image-by-image basis, or on parts of an image such as DCT blocks, macroblocks, image slices and so on.

The pre-encode process is repeated—either in parallel, in series, or a combination of the two—for multiple values of Q. The bit calculator 220 calculates the data quantity which would result from each of these Q values if a full encode were carried out. The Q selector 230 then selects two values of Q which give output data quantities either side of a required data quantity 235—that is to say, a value $Q_L$ which is the highest available value of Q which still leads to the required data quantity being exceeded[1]; and a value $Q_U$ which is the lowest available value of Q which does not lead to the required data quantity being exceeded. $Q_L$ and $Q_U$ are passed to the second pre-encoder 250 as control signals.

[1] In this embodiment, because each coefficient is divided by the value Q, a numerically smaller Q implies a less harsh quantisation of the input data. So, $Q_L$ represents a less harsh quantisation (generating more bits) than $Q_U$. Of course, this is just a definition by convention and the opposite convention could instead be used.

Figure 6:
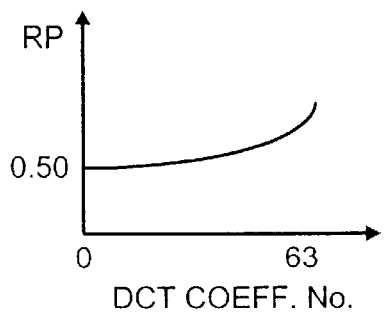
FIG. 6 schematically illustrates a range of rounding points.
Figure 6:
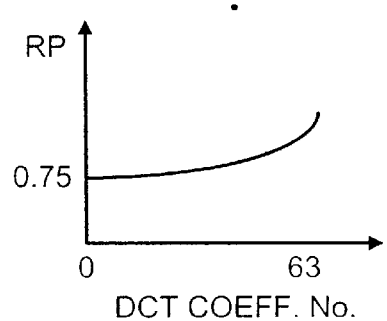

The second pre-encoder performs pre-encodes at a quantisation factor of $Q_L$ and a range of rounding point schemes retrieved from the RP look-up 260. In this embodiment, these RP schemes are fundamentally the same scheme as that described above for the first pre-encoder, but with the addition of various values $RP_{offset}$ which are constant across all coefficients. The original RP scheme used by the first pre-encoder can be considered to have an $RP_{offset}$ value of zero. So, the shape and nature of the RP curve remains the same between schemes, it is just raised in overall level so that the various curves cross the vertical axis at different points. This is illustrated schematically in FIG. 6 which shows extremes of the range of RP schemes implemented by the second pre-encoder 250. The values which are added to raise the curve, $RP_{offset}$, are:

- 0 (although the output data quantity for this RP scheme will be the same as that derived for $Q_L$ by the first pre-encoder and so need not be calculated again)
- $\frac{1}{16}$; $\frac{2}{16}$; $\frac{3}{16}$; and $\frac{4}{16}$ In other embodiments, various permutations of RP schemes derived using different methods can be used in the second pre-encoder 250—for example, an HVS-weighted scheme, a "flat" scheme and an exponential scheme. The relative merits of each of the trial schemes are compared by the Q/RP selector 280.

Again, the bit calculator 270 derives the data quantity which would result from the use of $Q_L$ and each of these RP schemes. The results of these, together with the original results for the data quantity for $Q_U$ derived by the bit calculator 220, are passed to the Q/RP selector 280.

It is known that the results for $Q_U$ and the basic RP scheme defined in the RP look-up 210 meet the required data quantity. A test is then performed to detect which (if any) of the RP schemes for Q=$Q_L$ also meets the required data quantity. Of these, the one having the lowest RP offset is selected for further comparison with the $Q_U$ scheme. Of course, if none of the $RP_{offset}$ values at Q=$Q_L$ meets the required data quantity, no further comparison needs to be made and the values of Q=$Q_U$ and $RP_{offset}$=0 are selected for that image or part of an image.

Consider the example where the lowest RP offset to meet the required data quantity for $Q_L$ is $RP_{offset}$=$\frac{3}{16}$. So, the comparison needs to be made between:

(a) Q=$Q_U$; $RP_{offset}$=0; and
(b) Q=$Q_L$; $RP_{offset}$=$\frac{3}{16}$.

The following rules are followed in making the selection between these two possibilities, both of which (of course) generate less data than the required data quantity:

(i) if the difference between the two data quantities for (a) and (b) is more than a predetermined threshold difference (e.g. 3% of the required data quantity), then the scheme giving a data quantity closer to the required data quantity is selected.

However, for data quantities which differ by less than the threshold amount, one or two further tests are carried out.

(ii) the distortion resulting from the two Q/RP schemes is detected (see description of FIG. 7 below). If the distortion difference between the two schemes is less than a predetermined threshold amount then:

(iii) the lower RP at the higher Q value (i.e. Q=$Q_U$; $RP_{offset}$=0) is selected.

However, if the distortion difference between the two schemes is greater than the predetermined threshold amount, then:

(iv) the scheme giving the lower distortion is selected.

The selected values of Q and $RP_{offset}$ are passed to the quantiser 80 of FIG. 2.

Of course, if a different selection of RP schemes were used in the second pre-encoder 250, a short code word defining the scheme selected could be passed instead to the quantiser 80.

Figure 7:
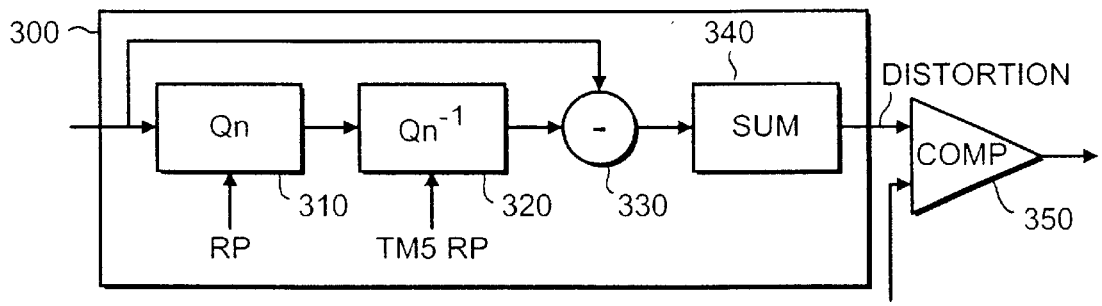
FIG. 7 schematically illustrates a distortion detector.

FIG. 7 is a schematic diagram of a distortion detector 300 for use in the Q/RP selector 280.

The distortion detector comprises a quantiser 310, a dequantiser 320, a subtracter 330 and a summing processor 340.

The distortion detector operates to assess the quantitative distortion introduced by each of the Q/RP schemes under test. In doing this, it can operate in parallel, with multiple versions of the detector 300 being provided, in series or (for larger numbers of comparison) in a combination of both. The basis of the distortion detection process is the realisation that, whatever rounding point scheme is used at the encoder, a standard "flat" TM5 rounding scheme will be "expected" and so implemented by the dequantiser in the decoder—whether that is in other downstream equipment or even in the end user's home.

So, the quantiser 310 operates to quantise and round the data using the Q/$RP_{offset}$ scheme under test. The resulting data is then passed to the dequantiser 320 which dequantises the data using the same Q value but a TM5 rounding scheme. This should regenerate the original DCT data along with some distortions or noise, which are extracted by the subtracter which subtracts the original DCT data (after a delay—not shown) from the quantised-dequantised version. The distortions detected by the subtracter are then summed across the picture unit in question (e.g. a block, slice or image) using the summation processor 340. The distortion results for each Q/RP combination are compared using a comparator 350, which outputs the difference between the two distortion values.

The technique shown in FIG. 7 (apart from the comparator 350) can also be used in a slightly different way, to check that the assumptions made during the selection of rounding points, namely that a variation in RP/Q gives a substantially monotonic relationship between quantity of compressed data ("bits") and signal to noise ratio—or more generally, distortions or data errors introduced by the compression process.

This embodiment operates as follows. The trial-encoder/trial decoder of FIG. 7 operates in parallel with, before or after the main encoding process, and encodes some or all of the image blocks using at least a subset of the range of quantisation factors and Rps available to the main quantising process. In a particular example, the trial system operates after the main encoder and uses just the selected Q value (perhaps with one or two adjacent Q values) and all of the RP regimes. In order to achieve this while keeping step with the main encoder, the trial system must operate (a) faster than the main encoder; (b) using parallel processing streams; and/or (c) using only a subset of image blocks.

The relationship between quantity of compressed data (measurable at the output of the trial quantiser 310) and SNR (measurable at the output of the summation processor 340) is detected by a detector (not shown) and assessed for monotonicity. That is to say, an increase in bits should give an improvement in SNR. Deviations from monotonicity of under a small percentage—e.g. 5%—are ignored.

If this detection shows that one or more Q/RP regimes are not giving the required substantially monotonic relationship for the current image material, those Q/RP regimes are flagged so that they are not available for selection for use in the main compression processing. The flag may expire after a certain number of images—perhaps 100 images—as there may have been a scene change by then so that the Q/RP regime is again useful in providing this monotonic relationship. If the processing described above takes place after the start of the main compression processing, the flag can take effect from the next image or from later blocks within the same image.

The technique just described can also be useful in related techniques for audio data compression, for example in MPEG-audio, where sub-band coding is used instead of DCT, but otherwise the compression techniques are broadly similar.

Figure 8:
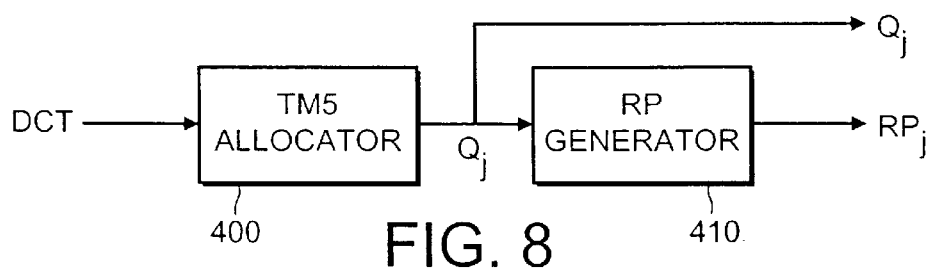
FIG. 8 schematically illustrates a second embodiment of a bit allocator.

FIG. 8 schematically illustrates another embodiment of a bit allocator 70.

In this embodiment, a "standard" TM5 rate control algorithm 400 is used to generate a quantisation factor Q. The rounding point scheme is then generated by an RP generator 410 from the "fractional" part of Q.

In the TM5 allocator 400, Q is determined in the established way by the fullness of the relevant virtual buffer (I, P or B, but in this embodiment, only I frames are used):

$$Q_j = \frac{d_j * 31}{r}$$

where:

$Q_j$=reference quantiser scale for macroblock j $d_j$=virtual buffer fullness for macroblock j r=reaction parameter=2* bit rate/picture rate $Q_j$ is rounded to the nearest integer:

$Q_j(1) = Q_j + 0.5$ $Q_j(2) = \text{trunc}(Q_j(1))$

Finally, $Q_j(2)$ is converted to a required linear or non-linear Q scale. The buffers are updated after each macroblock has been encoded:

$d_j = d_o + B_{j-1}$ $$d_j = d_0 + B_{j-1} - \frac{T * (j-1)}{MB\_cnt}$$

where:

$d_0$=initial fullness of virtual buffer (=10* r/31 for I frames)

$B_j$=number of bits generated by encoding all macroblocks up to and including macroblock j T=target number of bits for picture MB_cnt=total number of macroblocks in picture The above description is part of the standard TM5 rate control system, and results in the generation of an output value $Q_j$. In the present embodiment, the RP generator processes $Q_j$ to generate an RP scheme for the current macroblock j.

In the RP generator 410, the fractional part of $Q_j(1)$ is used to determine the rounding point scheme to be used. Define:

$\text{frac} = Q_j(1) - Q_j(2)$

The following ranges are defined, to generate values of $RP_{offset}$ for use with RP schemes such as those described above (a basic exponential scheme having, for $RP_{offset}=0$, a RP for the lowest frequency coefficients of 0.5).

if $0 \leq \text{frac} < 0.25$ then $RP_{offset}=0$ if $0.25 \leq \text{frac} < 0.5$ then $RP_{offset}=1/16$ if $0.5 \leq \text{frac} < 0.75$ then $RP_{offset}=2/16$ if $0.75 \leq \text{frac} < 1$ then $RP_{offset}=3/16$ These results define the value $RP_{offset}$—the rounding point schemes varying from coefficient to coefficient are then added as described above. However, a simple "flat" rounding point, constant from coefficient to coefficient within a DCT block, can be used, where the "flat" RP is equal to (for example) $0.5 + RP_{offset}$.

It will be clear that the invention could be embodied in hardware or software, a combination of the two, or a medium such as an ASIC (application specific integrated circuit). In the case that the invention is embodied, at least in part, as software, it will be appreciated that an appropriate computer program and a storage medium by which such a program is stored are envisaged as embodiments of the invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Data compression apparatus in which data blocks are compressed on a block-by-block basis, said apparatus comprising:

(i) a frequency-transformer for frequency-transforming blocks of data to generate corresponding groups of coefficient values representing respective frequency components of said data blocks;

(ii) a quantiser operable on said groups of coefficient values to map each of a contiguous plurality of ranges of coefficient values onto respective quantised data values, an extent of each range being controlled by a quantisation factor and a first non-zero range boundary being defined by a range boundary parameter; said quantiser being operable to vary said boundary parameter between data blocks by selecting from a range of boundary parameter regimes;

(iii) a detector operable:

(a) to trial-encode at least some of said data blocks using a range of at least one quantisation factor and at least a subset of said range of boundary parameter regimes available for use by the quantiser, in order to assess a quantity of compressed data produced with each quantisation factor/boundary parameter regime;

(b) to trial-decode said trial-encoded blocks using a corresponding quantisation factor;

(c) to compare said trial-decoded blocks with said data blocks before trial encoding, in order to assess data errors introduced by said trial-encoding and decoding;

(d) to detect whether said relationship between quantity of data produced by said trial-encoding and data errors introduced by said trial-encoding is substantially monotonic; and (iv) a quantisation controller operable in response to a detection that said relationship between quantity of data produced by said trial-encoding and data errors introduced by said trial-encoding is not substantially monotonic, to vary said range of boundary parameter regimes available for use by said quantiser.

2. Apparatus according to claim 1, in which said data blocks are image blocks of a video signal, and said coefficients generated by said frequency-transformer represent respective spatial frequencies of said image blocks.

3. Apparatus according to claim 1, in which said quantiser comprises:

a divider operable to divide each coefficient value by an amount dependent on said quantisation factor, so that said divided coefficient value lies between a pair of quantised data values; and rounding logic operable to round each divided coefficient value to a next higher quantised data value or to a next lower quantised data value in dependence on whether said divided coefficient lies above or below a decision threshold between said next lower and said next upper quantised coefficient values, said decision threshold being defined by said boundary parameter.

4. Apparatus according to claim 1, in which said quantised data values are integer values.

5. Apparatus according to claim 4, in which said boundary parameter defines a rounding threshold between zero and one;

said rounding logic being operable to round a divided coefficient value up or down in dependence on whether said fractional part of said divided coefficient value is greater than or less than said rounding threshold.

6. Apparatus according to claims 1, in which said frequency-transformer is a discrete cosine transformation encoder, said coefficient values being discrete cosine transformation coefficients.

7. Apparatus according to claim 1, in which said boundary parameter regimes available to said quantiser include at least a regime in which said boundary parameter varies from coefficient to coefficient in dependence on said frequencies represented by said coefficients.

8. Apparatus according to claim 7, in which said boundary parameter regimes available to said quantiser include at least a regime in which said boundary parameter varies from coefficient to coefficient in a predetermined dependence on said frequencies represented by said coefficients.

9. A method of data compression in which data blocks are compressed on a block-by-block basis, said method comprising the steps of:

(i) frequency-transforming blocks of data to generate corresponding groups of coefficient values representing respective frequency components of said data blocks;

(ii) quantising groups of coefficient values to map each of a contiguous plurality of ranges of coefficient values onto respective quantised data values, an extent of each range being controlled by a quantisation factor and a first non-zero range boundary being defined by a range boundary parameter; said quantiser being operable to vary said boundary parameter between data blocks by selecting from a range of boundary parameter regimes;

(iii) trial-encoding at least some of said data blocks using a range of at least one quantisation factor and at least a subset of the range of boundary parameter regimes available for use by said quantiser, in order to assess a quantity of compressed data produced with each quantisation factor/boundary parameter regime;

(iv) trial-decoding said trial-encoded blocks using a corresponding quantisation factor;

(v) comparing said trial-decoded blocks with said data blocks before trial encoding, in order to assess data errors introduced by said trial-encoding and decoding;

(vi) detecting whether the relationship between quantity of data produced by said trial-encoding and data errors introduced by said trial-encoding is substantially monotonic; and (vii) in response to a detection that said relationship between quantity of data produced by said trial-encoding and data errors introduced by said trial-encoding is not substantially monotonic, varying said range of boundary parameter regimes available for use by said quantiser.

10. Computer software comprising program code for carrying out a method according to claim 9.

11. A storage medium by which software according to claim 10 is stored.

* * * * *